June 12, 1956  J. POLINCOVSKY  2,749,924
COMBINATION KNIFE
Filed Aug. 12, 1953
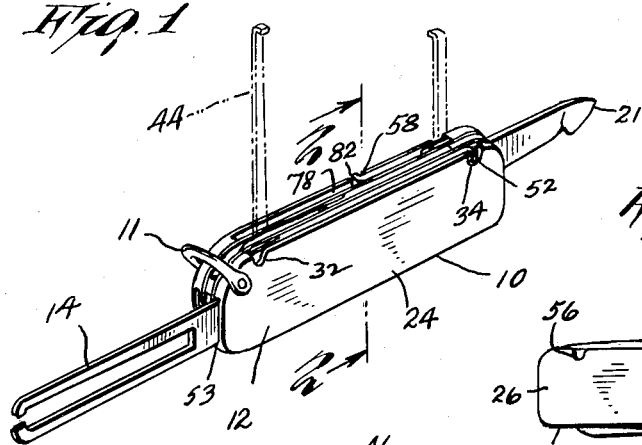
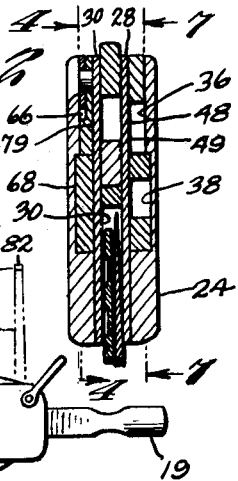
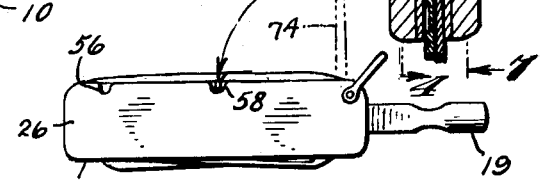
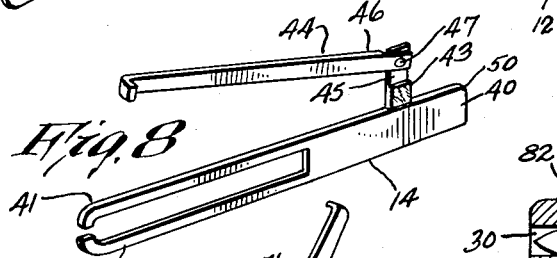
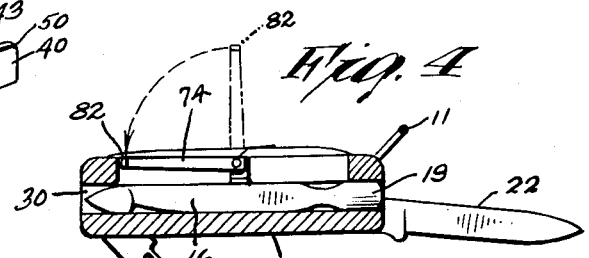
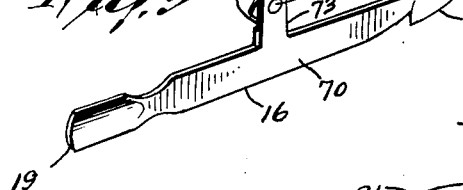
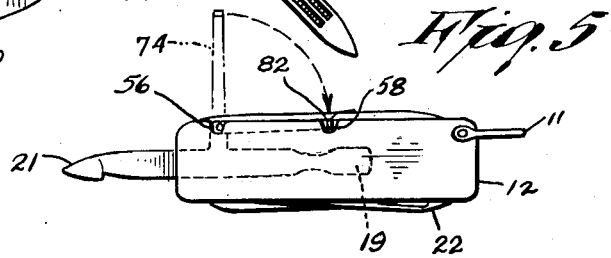
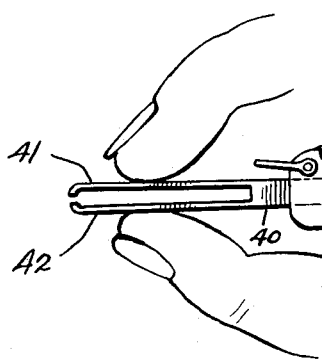
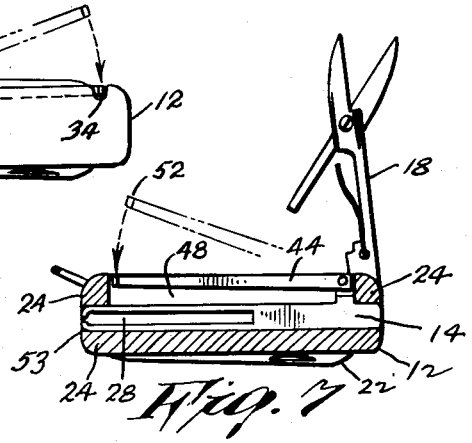

United States Patent Office 2,749,924
Patented June 12, 1956

2,749,924

COMBINATION KNIFE

Jack Polincovsky, New York, N. Y.

Application August 12, 1953, Serial No. 373,800

4 Claims. (Cl. 132—76.2)

This invention relates generally to cutlery, and more particularly to a combination knife having a plurality of tools or implements in a single handle.

Certain tools or implements which have a single cutting edge have heretofore been constructed and arranged to pivot into and out of recesses in the handle. The knife, for example, when pressed against its cutting edge, has its opposite edge abutting against a stop. This stop prevents the blade from becoming undesirably displaced.

Under circumstances where the implement or tool is most useful when it can be used by movement in any direction, such pivotal mountings are inadequate.

It is therefore among the objects of the present invention to provide structure by which the desired implement may be easily and quickly projected from the handle and readily locked in place so that the implement can be moved in any direction, without its accidentally shifting in position with respect to the handle.

Certain implements complement each other in use, and it is desirable that they may be rapidly and conveniently alternated. Another object herein, therefore, lies in the provision of structure of the class described which permits this mode of operation.

Certain of the tools mounted on the common handle can be dangerous if inadvertently or accidentally exposed, as for example when the device is in the user's pocket.

Another object herein lies in the provision of means which securely locks the tools in the retracted and covered position thereof, until their use is required.

In order that the implements have a stable positioning with respect to the handle, relatively close tolerances are preferable. This gives rise to greater friction between the parts. A consequence of this is that the sliding of the implements becomes difficult. In accordance with the present improved construction, small operating levers are provided, which after they have served this function, act as locking means.

These objects and other incidental ends and advantages will more fully appear in the progress of this diclosure and be pointed out in the appended claims.

In the drawing, in which similar reference characters designate corresponding parts throughout the several views:

Figure 1 is a front view in perspective of a preferred embodiment of the invention.

Figure 2 is an enlarged vertical sectional view as seen from the plane 2—2 on Figure 1.

Figure 3 is a rear elevational view.

Figure 4 is a reduced sectional view as seen from the plane 4—4 on Figure 2.

Figure 5 is a front elevational view.

Figure 6 is a front elevational showing the tweezer element as in use.

Figure 7 is a reduced vertical sectional view as seen from the plane 7—7 on Figure 2.

Figure 8 is a view in perspective of the tweezer element and associated parts.

Figure 9 is a view in perspective of the composite cuticle pusher and cutter element.

In accordance with the invention, the device, generally indicated by reference character 10, comprises broadly a handle element 12; a single projectible element 14; and a double projectible element 16. The handle element may also carry a plurality of pivotally mounted implements, such as the scissors element 18, nail file and cleaner element 20, and knife element 22.

The handle element 12 may have a front member 24, a rear member 26, and a plurality of divider members 28 and 30. Pivotally disposed between the divider members 28 and 30, are the scissors element 18, the nail file and cleaner element 20, and the knife element. These elements, in the outwardly rotated positions thereof, are suitably maintained in the usual fashion well-known in the art, and therefore not shown or described in detail.

The exterior configuration of the front handle member 24 may be of any suitable shape, except that it is provided with first and second indentations 32 and 34.

Internally, the front handle member 24 is provided with a recess 36 and a through groove 38 (see Figure 2). The single projectible element 14 is best seen in Figure 8, and includes a body 40, tweezer fingers 41 and 42, an upstanding lug 43, and a pivotally mounted actuating lever 44. The lug has a set back 45, while the inner end 46 of the lever is correspondingly reduced in thickness, so that when joined by the rivet 47, the total thickness of the parts is substantially equal to the thickness of the lug 43. The lug at its greatest thickness is substantially equal to the thickness of the lever 44, and both of these are slightly thinner than the body 40. The thickness of the lever is substantially equal to or slightly less than the distance between the inner upper surface 48 (Figure 7) of the front handle member 24, and the outer surface 49 (Figure 2) of the front divider member 28. The body 40, as well as the fingers 41 and 42, have a thickness substantially equal to or slightly less than the distance between the inner surface of the groove 38 and the outer surface 49. Thus, the top surface of the body 40 and the finger 41 engages the rabbet formed at the uppermost portion of the groove 38. This construction prevents the inner end 50 of the body 40 from rising (as viewed in the figures), while the single projectible element 14 is in an intermediate position thereof. In the retracted position, the element 14 has the position shown in Figure 7. It is maintained thereat by the frictional engagement of the lever 44 and by the right angled tip 52 engaging the indentation 32. The tip 52 may be engaged by the user's fingernail, or finger, and swung in a clockwise direction as shown in the dot-dash lines in Figure 7, until said tip has cleared the indentation 32. Using the lever 44 as a handle, or operating medium, the user pushes the handle to the left as viewed in Figure 7, whereupon the element 14 becomes projectible through the opening 53 so that it will appear as shown in Figure 1. The lever 44 may appear as shown in the dot-dash lines in Figure 1. Next, the lever 44 is rotated in a clockwise direction as viewed in the last mentioned figure, and finally the parts are locked in place by pressing the tip 52 into the indentation 34 as shown by full lines in Figure 1.

In this position the element 14 is securely locked and may be moved in any direction without having its spatial relationship with the handle element 12 disturbed. The tweezer operation may be performed in the manner shown in Figure 6, which incidentally, shows the lever 44 about to make engagement with the second indentation 34.

The exterior configuration of the rear handle member may be preferably of a shape corresponding to that of the first handle member, except that it is provided with an outer notch 56 and an inner notch 58. Internally, the rear handle member 26 is provided with a recess 66 and a through groove 68 (see Figure 2). The double projectible element 16 is best seen in Figure 9, and includes a body 70, a cuticle pushing element 19, and a cuticle trimming element 21. The element 14 also includes an upstanding lug 73 and a pivotally mounted actuating lever 74. The lug 73 has a set back 75, while the inner end 76 of the lever 74 is correspondingly reduced in thickness so that when joined by the rivet 77, the total thickness of the parts is substantially equal to the thickness of the lug 73, the lug 73 at its greatest thickness (transversely of the device 10) is substantially equal to the thickness of the lever 74, and the lug and lever are each slightly thinner than the body 70. The thickness of the lever is substantially equal to, or slightly less than the distance between the inner upper surface 78 (Figure 1) of the rear handle member 26, and the outer surface 79 (Figure 2) of the rear divider member 30. The body 70, as well as the elements 19 and 21, have a thickness substantially equal to, or slightly less than, the distance between the inner surface of the groove 68, and the outer surface 79. Thus, the top surface of the body 70 engages the rabbet formed at the uppermost portion of the groove 68. This construction prevents the inner end (in the case of the double projectible element the inner end will be that element which is concealed when the opposite element is projected for use) from rising, as viewed in the figures.

In the retracted position, the element 16 takes the position shown in Figure 4. It is maintained thereat by the frictional engagement of the lever 74 and by the right angle tip 82 engaging the indentation 56. The tip 82 may be engaged by the user's fingernail or finger, and swung in a clockwise direction as viewed on Figure 4, where it may take the position shown by the dot-dash lines thereon. If it is desired to utilize the element 19, the lever is moved to the right as viewed in Figure 4, so that said element 19 will be projected and visible as seen in Figure 3. The element 19 will be locked in its extended position by the counter clockwise movement of the lever, as viewed in Figure 3, until the tip 82 is seated within the inner notch 58.

When it is desired to use the element 21, the lever 74 is disengaged from any notch and is moved all the way to the left as viewed in Figure 3. It will now take a position shown by the dot-dash lines in Figure 5. In order to lock the lever into element 21, the lever is now moved in a clockwise direction as viewed in Figure 5, until the tip 82 is disposed within the inner notch 58. When the elements 19 and 21 have served their purpose, the lever 74 is moved to a generally central position and is swung counter clockwise as viewed in Figure 4, until the tip 82 is engaged within the outer notch 56. This position is shown in Figure 1.

It may thus be seen that I have provided a novel and useful combination knife. The loop 11 may be used to attach the device 10 to a chain, and by virtue of the construction shown and described, a large number of different tools or implements are readily available, each capable of optimum use. The tools of operative elements may be selectively projected for use, and when so projected, remain steady and sure within the handle element.

I wish it to be understood that I do not desire to be limited to the exact details of construction shown and described for obvious modifications will occur to a person skilled in the art to which the present invention pertains.

I claim:

1. A combination knife comprising: a handle element having a passage open at two ends; a projectible element slidably disposed in said passage and shiftable in two directions therealong; a lever pivotally connected to said projectible element and adapted when moved to move said projectible element; said lever being detachably engagable with said handle element for securing said projectible element in adjusted positions thereof.

2. Combination knife structure comprising: a handle element; said handle element having a passage; a projectible element; said projectible element being slidably disposed in said passage, and shiftable to at least two positions, in one of which a portion of said projectible element extends beyond said handle element, and lever means pivotally connected to said projectible element to shift the same.

3. A combination knife comprising: a handle element having a passage open at two ends, and an indentation disposed between said ends; a projectible element slidably disposed in said passage and shiftable in two directions therealong; and an elongated lever pivotally connected at one end thereof to said projectible element and at an opposite end having means for engaging said indentations in said handle element for fixing the position of said projectible element with respect to said handle element.

4. A combination knife comprising: a handle element having a passage open at two ends and a plurality of indentations disposed between said ends; a projectible element slidably disposed in said passage and shiftable in two directions therealong; and an elongated lever pivotally connected at one end thereof to said projectible element and at an opposite end having means for selectively engaging one of a plurality of said indentations in said handle element for fixing the position of said projectible element with respect to said handle element in a selected relative position.

References Cited in the file of this patent

UNITED STATES PATENTS

| 915,007 | Wilson | Mar. 9, 1909 |
| 2,215,877 | Johnson | Sept. 24, 1940 |
| 2,447,451 | Windmoeller | Aug. 17, 1948 |

FOREIGN PATENTS

| 210,022 | Great Britain | Jan. 24, 1924 |
| 747,559 | France | June 20, 1933 |